United States Patent [19]
Hayashi et al.

[11] Patent Number: 6,108,826
[45] Date of Patent: Aug. 29, 2000

[54] ADJUSTABLE TRAP FOR A TOILET STOOL

[75] Inventors: Ryosuke Hayashi; Hiroshi Kobayashi; Makoto Watanabe; Hiroshi Okada; Hiroshi Tanaka; Toshiaki Kayahara; Katsuyuki Suehiro; Masaya Soh; Hideshi Yamamoto; Kenichi Ogata, all of Kitakyushu, Japan

[73] Assignee: Toto Ltd., Chigasaki, Japan

[21] Appl. No.: 09/035,950

[22] Filed: Mar. 6, 1998

Related U.S. Application Data

[63] Continuation-in-part of application No. 08/718,513, filed as application No. PCT/JP95/00676, Apr. 6, 1995, Pat. No. 5,819,326.

[30] Foreign Application Priority Data

Apr. 6, 1995 [WO] WIPO ............... PCT/JP96/00676

[51] Int. Cl.⁷ .................................................. E03D 11/16
[52] U.S. Cl. ........................................... 4/252.1; 4/420
[58] Field of Search .................. 4/420, 252.1, 252.2, 4/252.3, 252.4, 252.5, 252.6; 285/24, 27

[56] References Cited

U.S. PATENT DOCUMENTS

| | | |
|---|---|---|
| 4,463 | 3/1988 | Allan . |
| 670,588 | 3/1901 | Hinsdale . |
| 674,439 | 5/1901 | Foy . |
| 901,545 | 10/1908 | Morrison . |
| 961,685 | 6/1910 | Cosgrove . |
| 1,335,056 | 3/1920 | Hinsdale . |
| 1,878,195 | 9/1932 | Sisk . |
| 2,449,265 | 9/1948 | Williams ................................ 138/49 |
| 4,171,548 | 10/1979 | Wilson ................................... 4/421 |
| 4,253,685 | 3/1981 | Camp ................................. 285/24 X |
| 4,810,008 | 3/1989 | Brodie ................................... 285/31 |
| 4,982,454 | 1/1991 | Saltel et al. ........................ 4/420 X |
| 5,176,406 | 1/1993 | Straghan ............................... 285/24 |

FOREIGN PATENT DOCUMENTS

| | | |
|---|---|---|
| 44726 | of 0000 | Germany . |
| 2035134 | 5/1990 | Japan . |
| 1190773 | 5/1970 | United Kingdom . |

*Primary Examiner*—Charles E. Phillips
*Attorney, Agent, or Firm*—Michael D. Bednarek; Shawpittman

[57] ABSTRACT

A modular toilet bowl assembly bowl assembly that allows adjustment of the relevant dimensions of the inlet of the outlet as well as the height of a toilet bowl without modifying the toilet bowl body. The toilet bowl includes a toilet bowl and upper drain pipe portion that are formed integrally as a single piece, a lower drain pipe portion that is formed separately from the toilet stool. The lower drain pipe portion may be formed of a series of parts having known dimensions so that by interior moving predetermined parts, the length or height of the toilet bowl can be adjusted.

13 Claims, 7 Drawing Sheets

FIG. 3A
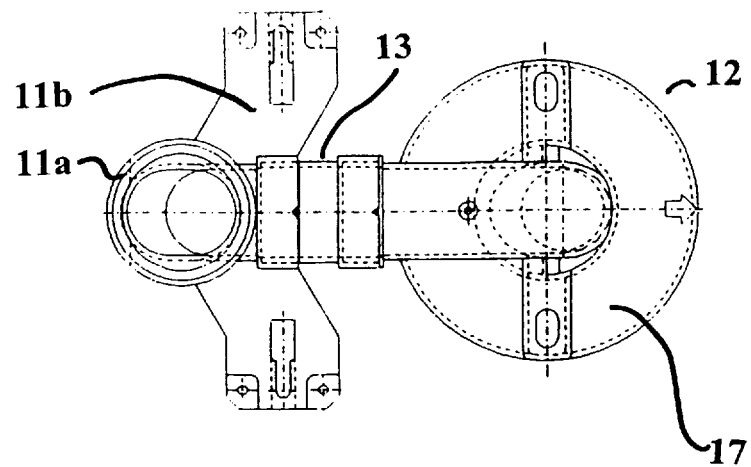
FIG. 4
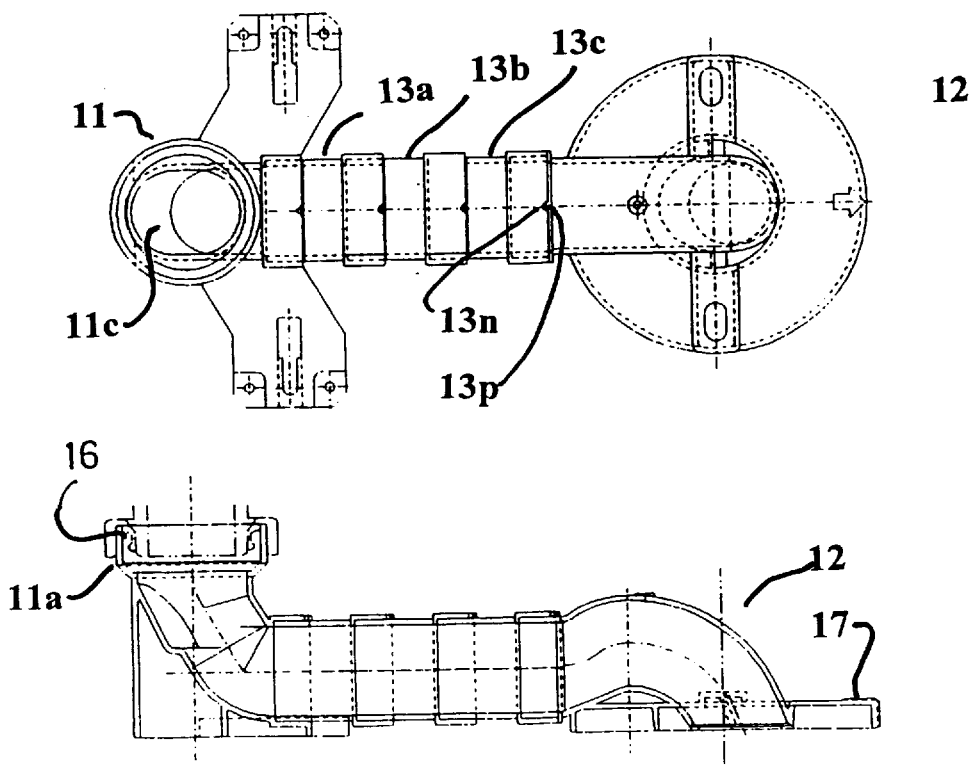
FIG. 4A

FIG. 11A
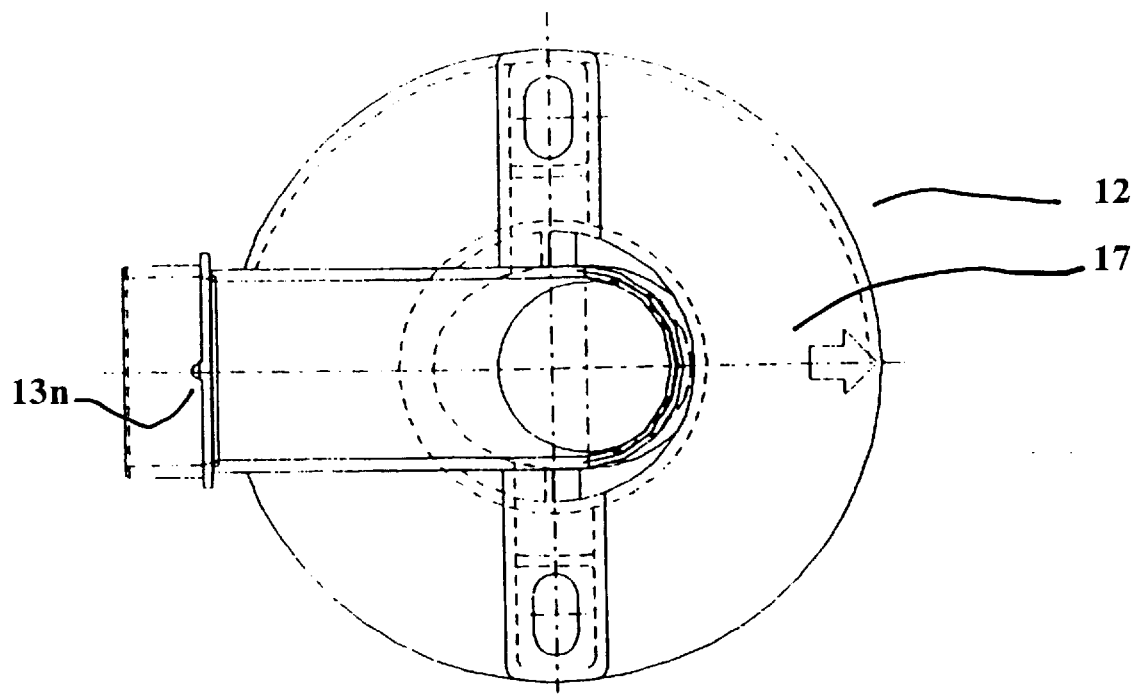
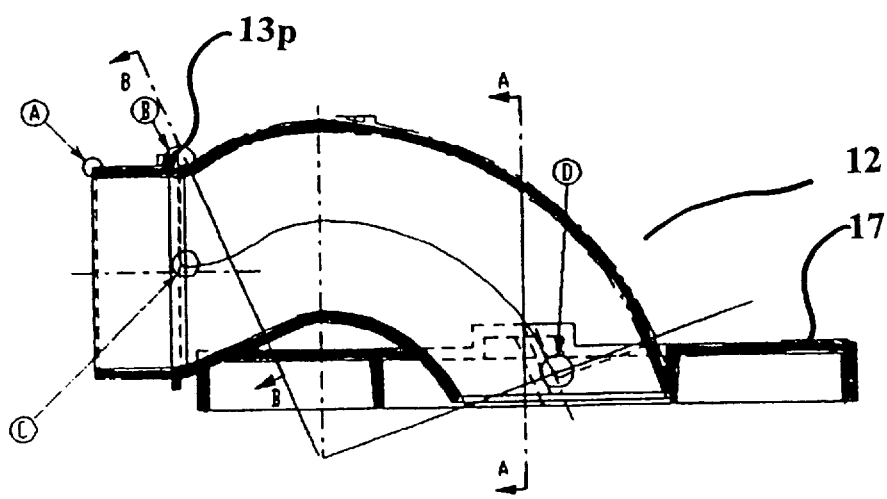
FIG. 11

ADJUSTABLE TRAP FOR A TOILET STOOL

RELATED APPLICATIONS

This application is a continuation-in-part of U.S. application Ser. No. 08/718,513 filed Oct. 8, 1996 and currently pending, which is the national stage application corresponding to International Application PCT/JP95/00676, filed Apr. 6, 1995 and having a priority date of Apr. 8, 1994.

BACKGROUND OF THE INVENTION (1) Field of the Invention

The present invention relates to a toilet bowl, more particularly, an adjustable trap for use in connection with a standard toilet bowl to allow use of the toilet bowl in various applications.

(2) Description of the Related Art

Toilet bowls are, of course, used in a wide variety of settings. Considering, for example, residential uses, bathrooms of new homes and existing homes have a tremendous variety of configurations. The variety of commercial settings is even more varied. To allow use of a few standard toilet configurations in these wide variety of applications, certain standards have been adopted. In the United States, for example, the drainage trap outlet port, which feeds into the drainage pipe, typically has a center that is 12 inches from the wall adjacent to the back end of the toilet bowl. The vast majority of rough-ins are built to this standard. However, some existing and new rough-ins require a toilet bowl having an outlet port that is either 10 inches or 14 inches from the wall adjacent to the back end of the toilet bowl.

To accommodate these applications, it has been necessary, in the past, to manufacture toilet bowls with at least these specific dimensions. Manufacturing toilet bowls to a varied set of specifications obviously introduces numerous inefficiencies into the manufacturing process. To understand this, it is useful to appreciate that toilet bowls are typically cast, ceramic or molded items. Manufacturing bowls to different standards therefore requires, among other things, a different set of molds and quite often, a different production line. As a consequence, manufacturers are reluctant to provide toilet bowls manufactured to unusual standards such as the 10 inch standard and the 14 inch standard. It follows that there is limited choice and value in these sizes.

Another significant dimension is the height of the toilet bowl from the floor. In the past, in the United States, this dimension has typically been 14 inches. However, the Americans with Disabilities Act (ADA) requires that any public facility have at least one toilet bowl having a height of 18 inches. Thus, manufacturers are now required to manufacture toilet bowls to two distinct dimensions. This introduces the same types of inefficiencies discussed above.

As noted above, the general approach to meeting the needs for toilet bowls having different dimensions has been to manufacture different sets of toilet bowls meeting these dimensions. Some have attempted to address these problems by providing toilets that can be retrofit in the field by, for example, providing specially-cut extensions to lengthen drain pipes to accommodate unusual applications. Typically such structures do not allow adjustment of the vertical height nor do they allow adjustments in predetermined length segments. In addition, the retrofit approach requires expensive custom installation and can adversely affect the appearance of the toilet fixture. Moreover, the effectiveness of this approach depends, to a large extent, on the skill of the installer, typically a plumber. Thus, quality is inconsistent.

Thus, there remains a need for a toilet bowl configuration that can be used in the various known applications, namely, applications requiring outlet ports centered 10 inches from the edge of the toilet bowl, outlet ports centered 14 inches from the edge of the toilet bowl and outlet ports centered 12 inches from the edge of the toilet bowl. Likewise, there is a need for toilet bowls that have a vertical height of between 17 and 19 inches (normally 18 inches) and the previous standard of 14 inches.

SUMMARY OF THE INVENTION

The present invention solves the need for a toilet bowl that can serve various purposes by providing a modular toilet bowl that includes an adjustable trapway and/or an adjustable height. This is accomplished by providing a separate, modular, lower trap assembly. The separate lower trap assembly, which is preferably formed of a plastic such as PVC, is adapted to include passage extension segments that each add a precise predetermined length to a passage. The passage segments are all the same length so that all the desired configurations can be achieved using identical segments. More specifically, in connection with the lengthening of the drain trap, the lower drain trap portion of the present invention has a drain trap length of 10 inches, but is separable at a straight portion of the drain trap. Drain trap extension modules or segments each add 2 inches in length to the drain trap. Thus, by adding one drain trap extension, the drain trap length becomes 12 inches. By adding a second drain trap extension segment, the drain trap length becomes 14 inches. Naturally, the design could be altered, without departing from this invention, so that a drain trap length of 8 inches can be extended to 10 inches by adding one segment, to 12 inches by adding a second drain trap extension segment and to 14 inches by adding a third segment.

The drain trap extension segments each include an anti-rotation construction. Preferably, this construction is in the form of a notch formed on one segment and a pin formed on the other segment. The notch receives the pin so as to keep the segments from rotating with regard to one another and with regard to the respective portions of the lower drain trap portion. Once assembled, the drain trap assembly is held in place by adhesive or the like. The anti-rotation construction helps maintain the integrity of the adhesive connection. The notch and pin assembly also introduces some play into the assembly to ensure a level assembly. In addition, if desired an additional means, such as a metal rod spanning the connected segments, may be used to maintain the alignment and connection of the assembly. The exterior of the segments may be formed with surface features, such as holes or grooves, to receive such additional means.

Similarly, in connection with the height of the toilet bowl, the lower drain trap portion is adapted to accept one or more vertical extension segments to increase the height of the toilet bowl from 14 inches to 18 inches (or some other acceptable height). Preferably, the vertical extension segments extend from the uppermost portion of the lower drain portion and fit directly into the cast portion of the trap. Since a trap is typically formed of a ceramic material and the lower drain trap portion is preferably formed of a PVC material, and because there is greater variation in the tolerance of the ceramic passageway that in the PVC pieces, it is preferably to provide a sealing ring that accommodates some difference in passageway dimensions. The sealing ring is provided at the junction of the lower drain trap portion and the upper drain trap portion to facilitate the connection of the ceramic upper drain trap portion with the plastic lower drain trap portion. To this end, the seal ring of the present invention includes an elastic portion. The seal ring then can expand to provide a tight interference fit between the upper drain trap portion and the lower drain trap portion. The seal ring is also preferably formed of a chemically resistant material so that it is does not suffer from permanent exposure to waste.

The modularly adjustable drain pipe of the present invention can be used in two distinct ways. From the manufacturer's point of view, the adjustable drain trap can be used to allow the manufacturer to sell toilet bowls configured to various dimensions, while still using a single standard toilet bowl dimension. In such a case, the manufacturer would simply assemble the lower drain pipe module and secure it to the toilet bowl, which includes the upper drain trap portion, to provide a compete toilet bowl assembly with the required dimensions.

Alternatively, it is possible to sell standard toilet bowls that include the upper drain pipe assembly and then sell a modular lower drain trap pipe portions and a plurality of drain trap extensions that can be assembled by a plumber in the field. Naturally, although the present invention is described generally, as a ceramic toilet bowl that includes an upper portion and a plastic (PVC) lower portion that includes various segments, it is possible to combine a portion of the lower drain trap assembly into the upper drain trap assembly so that extension tubes can be provided directly into the ceramic assembly.

The use of PVC piping is preferred because it has been plainly shown to be suitable for applications of this sort. This is evidenced by the fact that most drain pipes that are currently being built are made of PVC.

As noted previously, the general approach to meeting the needs for toilet bowls having different dimensions has been to manufacture different sets of toilet bowls meeting these dimensions or provide structures that can be retrofit in the field. In contrast to these known solutions, one important advantage of the present invention is that there is no need to measure the extensions segments. This is because the extension segments are made to standard lengths. Thus, a plumber knows that to accommodate a 12 inch rough-in, it is necessary to add one extension segment and to accommodate a 14 inch rough-in, it is necessary to add a second extension segment (assuming the standard length is 10 inches). This allows both simplicity of assembly and accurate alignment. Moreover, there is no waste when excess pipe is cut away.

Another advantage of the modular trap of the present invention is that forming the trapway in segments allows the manufacturer to form the trap in shapes that are not easily castable and moldable in a single piece. This is significant since it has been found that the shape of a trap is critically important to obtaining maximum flush efficiency. The present inventors have found that the trap construction in the present invention allows trap shapes that achieve results that are superior to those obtained in cast one-piece toilet bowls.

In accordance with one aspect of the present invention, it is also possible to provide separate pieces that lock the various drainpipe components in place to prevent accidentally loosening the seals between these components. For example, it is possible to provide a reinforcible metal bar once the assembly is compete to prevent assembly from being displaced during mounting.

Finally, because the lower drain pipe portion is plastic and formed in separate pieces, it is possible to realize, or at least more closely approximate, an idealized trap shape. Preferably, the drainage trap includes a bent flow passage connected by an ascending path, which extends obliquely upward toward the rear side of the toilet bowl body along the back face of the bowl part from the inlet, a descending path, which extends nearly vertically toward the lower side from the upper end of the ascending path, and a horizontal pulling path, which extends horizontally in front of the toilet bowl body A from the lower end of the descending path. The discharge port is opened in the vertical direction at the tip of the above-mentioned horizontal pulling path. Preferably, the radius of curvature of the dam part is designed such that that water does not come off the weir (dam).

In addition, because of the modular structure, a horizontal step or similar means for promoting the production of siphon may be provided inwardly of the trap, thereby causing the water passing over the upper end of the weir and falling on the descending channel to collide with the horizontal step. Preferably, the length of the horizontal step of the above-described means for promoting the production of siphon is selected. A gathered or pooled water part is created by the provision of a second weir. The provision of the gathered water portion is significant in that the water that pools in this gathered water part reduces the area that must be sealed to obtain a siphon action without forming an immovable restriction to flow. Thus, providing a pool of water makes it possible to obtain fast siphoning notwithstanding the increased size of the fluid path, but the water can be pushed out of the way to allow passage of large masses of waste.

The horizontal step means for promoting the production of siphon also has a function as a means for altering the direction of flow. The position, where the flow direction revising step is provided is important, and such means is provided in the position shown in the drawing, i.e., on the inner wall surface of the trap at the portion where the descending channel and the cross-laid channel intersect with each other. Providing the flow direction revising means in this position allows the correction of a uneven distribution of the flow velocity to be performed. Uneven distribution of flow often occurs at the place where the water has finished turning the bent part continuing from the descending channel of the discharge trap to the cross-laid channel.

BRIEF DESCRIPTION OF DRAWINGS

FIG. 3a is a top view of the lower trap assembly of FIG. 3;

FIG. 4A is a side section showing the lower trap assembly including three extension segments;

FIG. 4 is a top view of the lower trap assembly of FIG. 4A;

FIGS. 11–11a are detailed sectional and top views of the lower side connecting tube.

DETAILED DESCRIPTION

Figure 1:
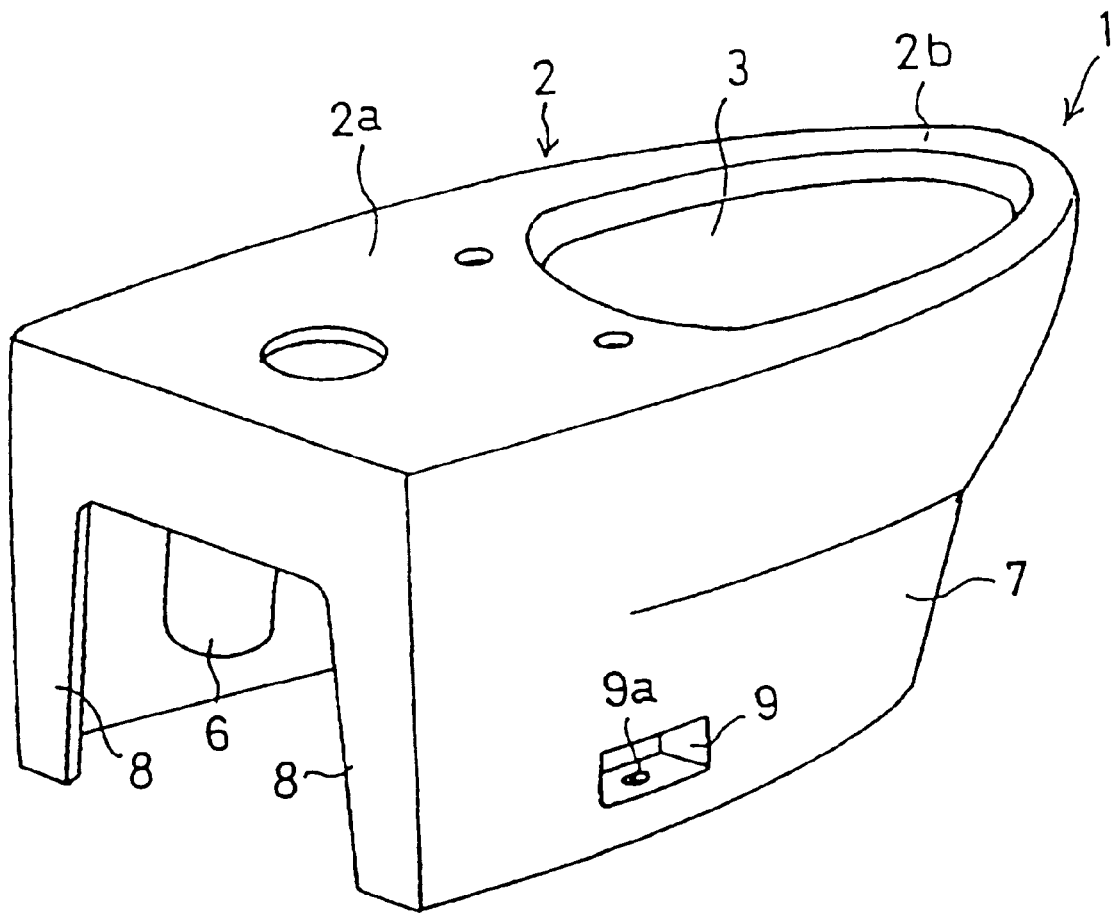
FIG. 1 is a partially exploded perspective view showing a toilet bowl with a removable lower trap assembly.
Figure 1:
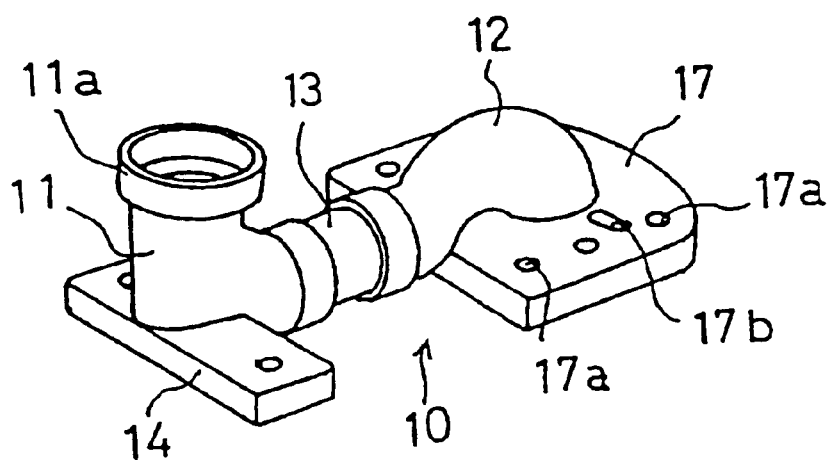

FIG. 1 shows a perspective of the overall assembly of the present invention. As shown, the assembly includes a toilet bowl or stool 1 that includes a bowl 3, a rim 2 that includes a water passage rim 2b and in upper surface 2a and a base 7 and 8. The toilet bowl or stool also includes an upper trap assembly 6 that is largely obscured in this view.

The assembly further includes a lower trap assembly 10 that comprises several discreet components. Specifically, the lower trap assembly includes an upper side connecting tube portion 11 that includes a rim 11a. The upper side connecting tube 11 is supported in and preferably secured to a mounting plate 14. The assembly 10 further includes a lower side connecting tube 12 that is supported on and preferably secured to a mounting plate 17. The assembly may further include one or more extension segments 13 which are described in greater detail hereinafter.

Figure 2:
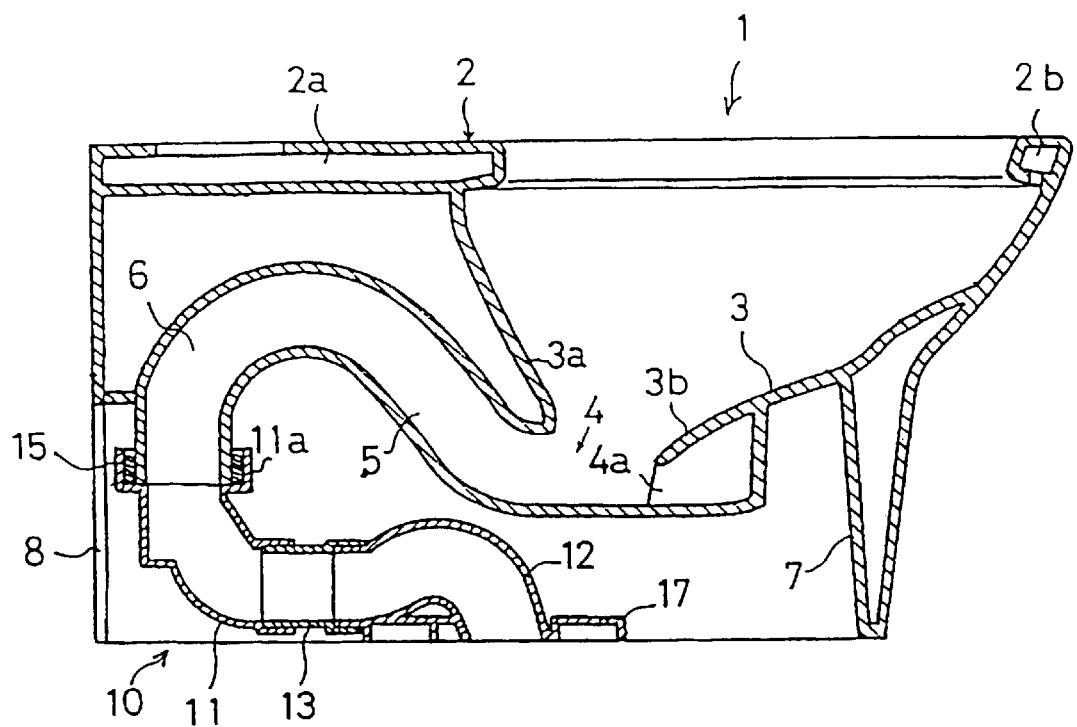
FIG. 2 is a cross-section of an adjustable trap for a toilet stool according to the present invention.
Figure 3:
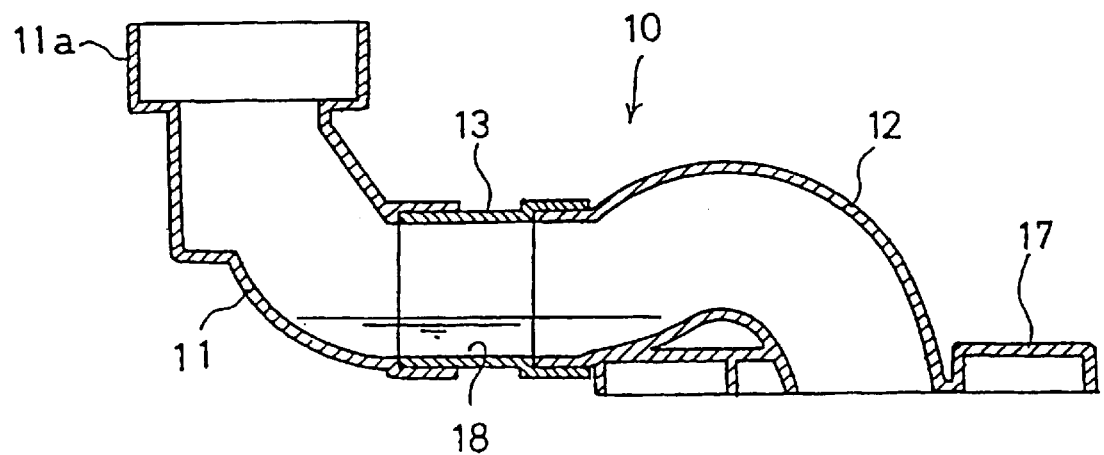
FIG. 3 is a detailed view of the lower trap assembly of the present invention.

FIG. 2 shows a sectional view of the assembly of FIG. 1 in an assembled state, and FIG. 3 shows a lower trap assembly in somewhat greater detail.

From FIG. 2, the details of the bowl 3, water rim passage 2 and upper trap portion 6 are more clear. The construction of the water rim passage 2, 2a, 2b is essentially conventional. In particular, the water rim passage 2 of the toilet bowl body 1 extends over the entire periphery of the upper end of the bowl and its bottom face is formed so that it faces the inside of the bowl part 3. The rim is connected by a rim water guide 2a to the drainage port (not shown) of the water washing tank on a center line that equally divides the toilet bowl into left and right.

Rim water discharge holes are bored in the bottom face of the entire periphery of the above-mentioned water passage rim 2a so that washing water that passes through the rim water guide 2a from the drainage port of the water washing tank flows into the water rim passage and is provided into the bowl part 3 along the bowl surface from the rim water discharge holes.

The bowl also includes a concave part for dropping waste formed in the bottom of the bowl and an inlet 4 of the drainage trap 6 is installed in the inward wall of the concave part for dropping waste. At the front wall part, a jet water discharge port 4a is provided so that it faces the drainage drop inlet 4. The jet water discharge port is separately installed apart from the rim water guide and the water rim passage connected to the above-mentioned drainage port via the jet water guide. Therefore, part of the water provided to the toilet bowl body 3 from the water washing tank or other supply is provided to the bowl part 1 from the rim water discharge holes to the rim water guide and the water passage rim. The remaining water is directly discharged toward the drainage trap outlet 4 from the jet water discharge port 4a to the jet water. Thus, a large amount of water is sent to the drainage trap at one time and waste is strongly pushed into the drainage trap.

To ensure proper siphoning, it is preferable to raise the water discharge rate at the jet side.

Figure 5:
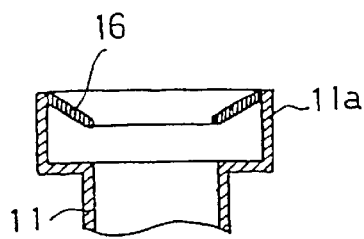
FIG. 5 is a detailed view showing a seal in the connecting rim of the upper side connecting tube.

As shown in FIG. 2, the lower trap assembly includes an upper connecting tube portion 11 that has a rim or collar 11a that is adapted to receive the downward curving tube of the upper trap portion 6. To facilitate a tight fit at this junction, the rim or collar portion 11a preferably includes an annular inwardly extending elastomeric seal of the type shown at 16 in FIG. 5.

The lower trap assembly itself is shown in greater detail in FIG. 3. As shown therein, the upper side connecting tube portion includes an expanded rim that is adapted to receive either the narrow end of an extension segment 13 as shown or the end of the lower side connecting tube portion 12. As best shown in the top view of FIG. 3a, the lower side connecting tube 12 is supported and located by mounting plate 17.

Figure 6:
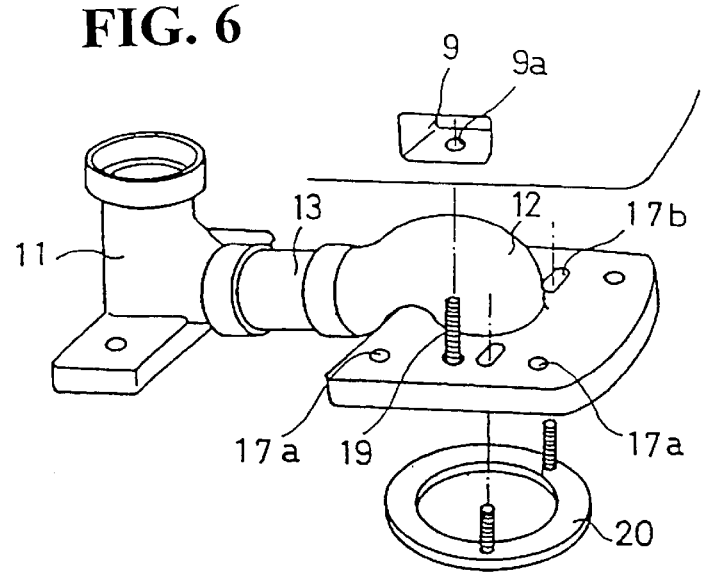
FIG. 6 is an exploded partial perspective view illustrating the mounting of the lower trap assembly to a drain pipe.

FIGS. 4 and 4a depict an expanded lower trap assembly that includes three interlocked extension segments 13a, 13b, 13c. Each of the extension segments 13a–c include a notch 13n at their expanded end and a projection 13p on the narrow cylindrical portion at a location that is designed such that when the projection 13p is located within the notch 13n of an adjacent extension segment or within the notch formed in the upper side connecting tube portion, the extension segment adds exactly two inches of length to the trap assembly. The interlocked segments are connected to one another and sealed with an adhesive. The interlocking of the extension and the notch also serves to prevent any rotation of the assembly once in place, which prevents loosening of the adhesive between the segments. FIG. 6 illustrates, somewhat schematically, the attachment of the lower drain assembly to the toilet bowl body. Specifically, bolts 19 extend through openings 17a formed in the mounting plate to secure the mounting plate and lower drain pipe assembly to the toilet bowl at the fixture location 9 through holes 9a. The lower drain pipe assembly is similarly connected to the main drain pipe 20.

Figure 7:
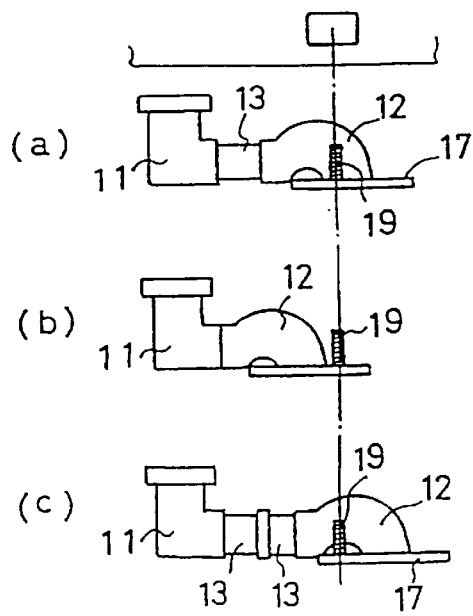
FIGS. 7a–7c show, schematically, how the extension segments can be used to mount the lower side connecting tube to the drain pipe at different locations without varying the location of the upper side connecting tube.
Figure 8:
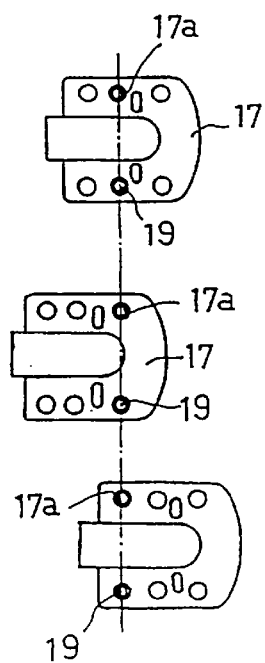
FIGS. 8a–8c show the position of the mounting pipe and connections at locations corresponding to the positions shown in FIGS. 7a–7c.

FIGS. 7 and 8 schematically illustrate how the location of the connection of the lower drain pipe assembly to the drain pipe can be varied using the present invention without changing the location of the upper side connecting tube 11. Specifically, in FIGS. 7a and 8a, the assembly is shown in a position that might, for example, accommodate a twelve inch distance from the wall to the center-line of the outlet to the drain pipe. By removing the extension segment or, depending on overall dimensions, using just a single extension segment, a shorter assembly can be provided as shown in FIGS. 7b and 8b.

Conversely, by providing an additional extension segment, as shown in FIGS. 7c and 8c, the connection location can be elongated. Naturally, the design could be altered so that a drain trap length of 8 inches can be extended to 10 inches by adding one segment, to 12 inches by adding a second drain trap extension segment and to 14 inches by adding a third segment, without departing from this invention.

Figure 9:
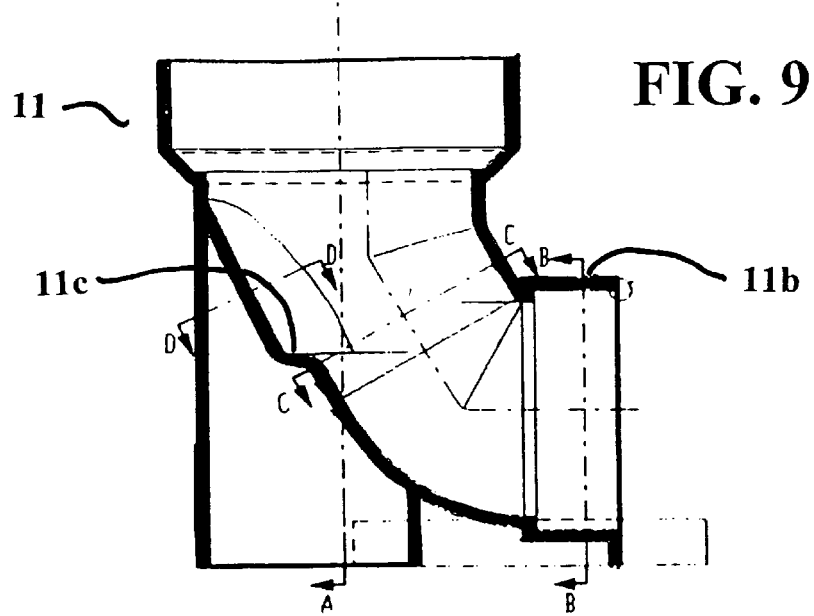
FIGS. 9–9a are detailed sectional and top views of the upper side connecting tube.
Figure 9A:
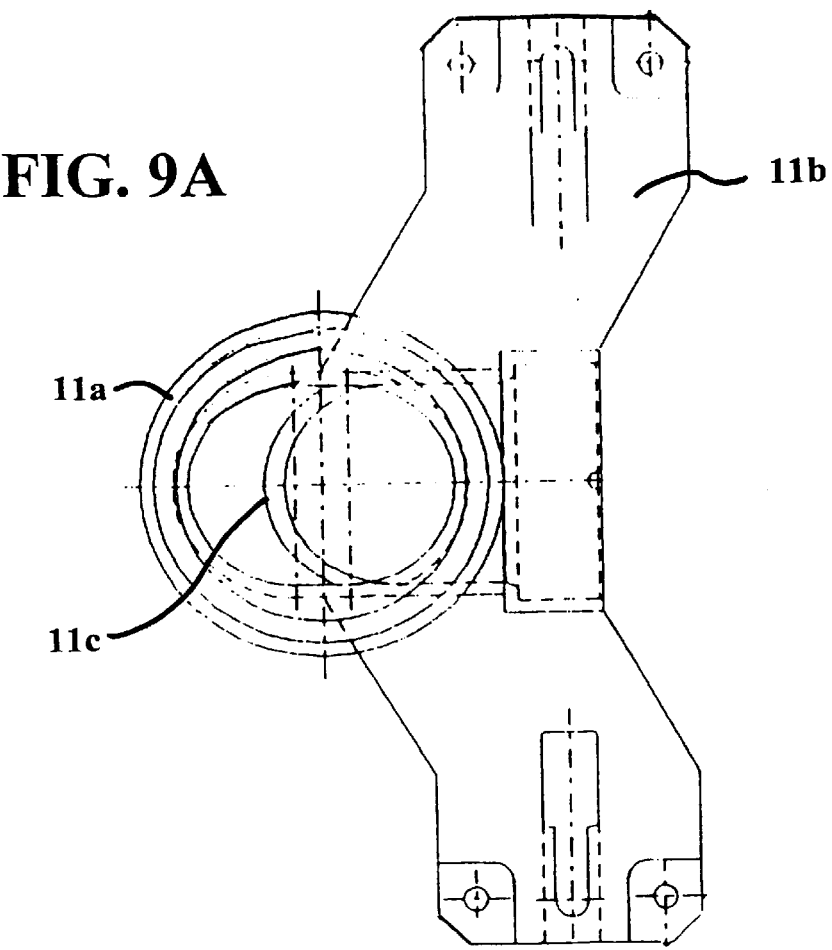

FIG. 9 shows, in section, the details of the upper side connecting tube 11 of the present invention. As shown therein, the tube includes an expanded portion 11a and expanded end 11b for receiving either an extension segment or a narrower portion of the lower side connecting tube 12. Another aspect of the present invention is evident from the sectional view of FIG. 9. Specifically, because it is a separate section, the upper side connecting tube portion can be made of a more complex shape than is ordinarily possible. Thus, in the example shown in FIG. 9, the passage includes a ridge portion 11c. The ridge portion causes water flowing through the tube to temporarily gather, which is useful in creating a siphon.

Figure 10A:
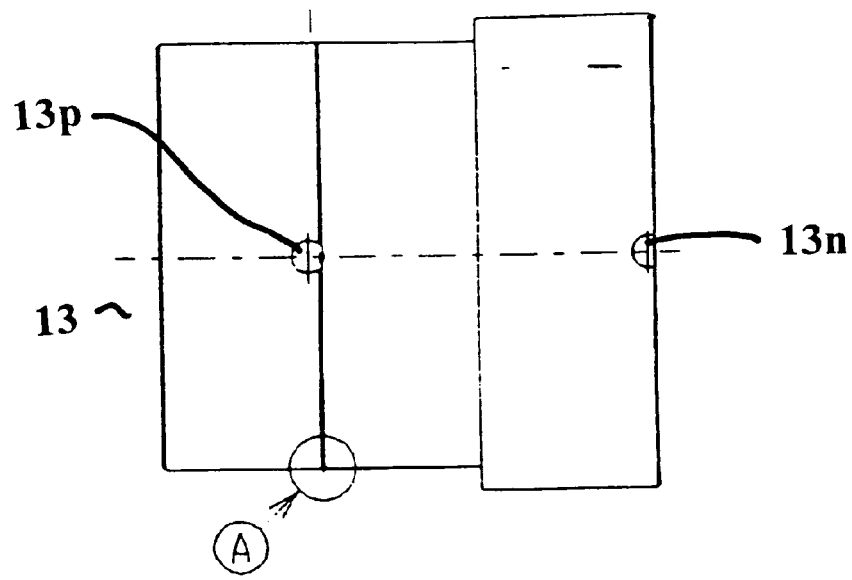
FIGS. 10–10a are detailed views of one extension tube segment.
Figure 10:
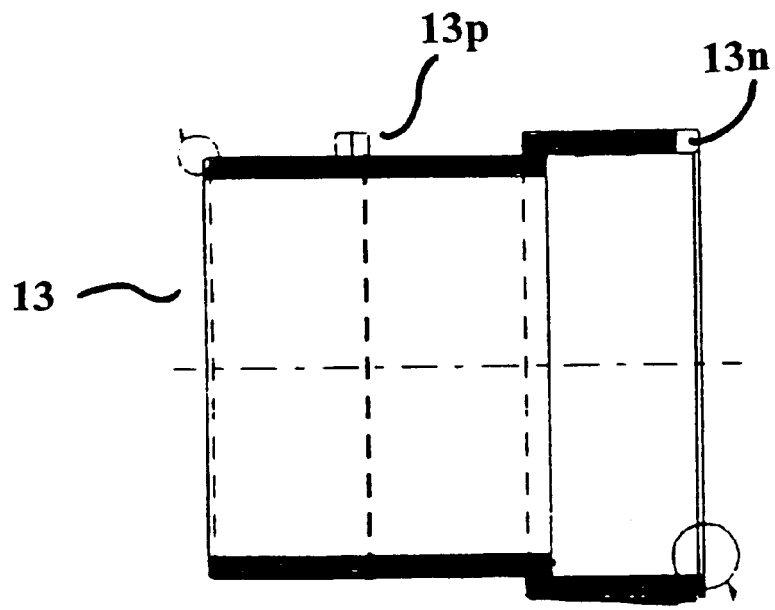

FIG. 10 shows a detailed view of the standard extension segment according to the present invention. An important aspect of the present invention is that each of the extension segments are identical. This aids in both manufacturing simplicity and assembly in the field. As shown in FIGS. 10 and 10*a*, each extension segment 13 includes a protrusion 13*p* and a notch 13*n*. Moreover, each extension segment includes a narrow cylindrical portion and an expanded cylindrical portion or rim. Preferably, the outer dimension of the narrow cylindrical portion is equal or slightly less than inner dimension of the expanded cylindrical portion, such that the narrow cylindrical portion of one extension segment can fit snugly into the expanded cylindrical portion of an adjacent extension segment. Moreover, to facilitate modularity, the expanded portion 11*b* of the upper connecting tube should have dimensions substantially identical to that of the expanded portion of an extension segment, and the narrow portion of the lower connecting tube 12 should have a dimension substantially equal to the narrow portion of the extension segment.

FIG. 11 shows details of the lower connecting tube 12. As shown therein, the lower connecting tube 12 has a mounting plate 17 formed integrally therewith. The lower connecting tube is adapted to be secured to a drain pipe on one end includes a narrow cylindrical portion that is substantially identical to the narrow cylindrical portion of the extension segment to allow the connecting tube to be received within either the expanded portion of an extension segment or the expanded portion of the upper side connecting tube.

Finally, because the lower drain pipe portion is plastic and formed in separate pieces, it is possible to realize, or at least more closely approximate, an idealized trap shape. FIGS. 2 and 9 most illustrate aspects an optimized drainage trap shape that can be obtained using the structure of the present invention. FIG. 2 shows an overall drain trap construction and FIG. 9 shows a preferred construction of a drain trap portion that is made possible by the fact that the drain trap is formed in segments. In particular, the inlet 4 is opened in the bowl 3 for dropping waste. The drainage trap 6 includes a bent flow passage connected by an ascending path 5, which extends obliquely upward toward the rear side of the toilet bowl body A along the back face of the bowl part 3 from the inlet 4, a descending path, which extends nearly vertically toward the lower side from the upper end of the ascending path, and a horizontal pulling path, which extends horizontally in front of the toilet bowl body A from the lower end of the descending path. The discharge port is opened in the vertical direction at the tip of the above-mentioned horizontal pulling path. Preferably, the radius of curvature of the dam part is designed such that that water does not come off the weir (dam).

In addition, because of the modular structure, a horizontal step or similar means for promoting the production of siphon may be provided inwardly of the trap, thereby causing the water passing over the upper end of the weir and falling on the descending channel to collide with the horizontal step. Preferably, the length of the horizontal step of the above-described means for promoting the production of siphon is selected. In the embodiment of FIG. 9, on the other hand, the passage includes a ridge portion 11*c*. The ridge portion causes water flowing through the tube to temporarily gather, which is useful in creating a siphon.

A gathered or pooled water part is created by the provision of a second weir. The provision of the gathered water portion is significant in that the water that pools in this gathered water part reduces the area that must be sealed to obtain a siphon action without forming an immovable restriction to flow. Thus, providing a pool of water makes it possible to obtain fast siphoning notwithstanding the increased size of the fluid path, but the water can be pushed out of the way to allow passage of large masses of waste.

The horizontal step or ridge means for promoting the production of siphon also has a function as a means for altering the direction of flow. The position, where the flow direction revising step is provided is important, and such means is provided in the position shown in the drawing, i.e., on the inner wall surface of the trap at the portion where the descending channel and the cross-laid channel intersect with each other. Providing the flow direction revising means in this position allows the correction of a uneven distribution of the flow velocity to be performed. Uneven distribution of flow often occurs at the place where the water has finished turning the bent part continuing from the descending channel of the discharge trap to the cross-laid channel.

What is claimed is:

1. A modular toilet bowl assembly comprising:

toilet bowl that includes a bowl portion and an upper drain pipe portion, the upper drain pipe portion having an inlet opening into the toilet bowl and an outlet portion, the toilet bowl and the upper drain pipe portion being integrally formed as a single piece;

a lower drain trap portion connected to the upper drain trap portion providing a continuous drain trap from the toilet bowl inlet to the waste outlet, the lower drain trap portion including:

a first drain pipe segment having first and second ends, the first end being coupled to the outlet of the upper drain pipe portion, the first drain pipe segment including a seal ring in direct contact with the outlet of the upper drain pipe portion; and a second drain pipe segment having first and second ends, the second end of the second drain pipe segment being coupled to the waste outlet by at least two sets of holes, including a first set and a second set, the second set being further away from the first drain pipe than the first set;

wherein the second end of the first drain pipe segment and the first end of the second drain pipe segment are formed with complementary coupling portions so that the second end of the first drain pipe segment and the first end of the second drain pipe segment can be coupled to form a drain pipe of predetermined length; and a plurality of extension segments that can be added to the drain pipe to lengthen the drain pipe, each of the extension segments having first and second ends, wherein the first and second ends of the extension segments are formed with complementary coupling portions so that first end of the extension segment can be coupled to the second end of the first drain pipe segment and second end of the extension segment can be coupled to the first end of the second drain pipe segment.

2. The system of claim 1, further comprising:

an extension segment located between the seal ring and the lower drain pipe portion to allow adjustment of the height of the toilet bowl assembly.

3. The system of claim 1, wherein each of the extension segments include:

a locking element that is adapted to lock in connection with an adjacent segment.

4. The system of claim 1, wherein the lower drain pipe portion is formed of PVC.

5. The system of claim 1, wherein the a first drain pipe segment has an internal fluid passage extending from the first end to the second end and wherein a step protrusion extends into the fluid passage at a location between the first and second ends to cause fluid passing through the fluid passage to gather in the vicinity of the step protrusion.

6. The system of claim 1, wherein the complementary coupling portions comprise an expanded sleeve on one member that is adapted to receive the other member and wherein the expanded sleeve is formed with an axial notch and the other member is provided with a radially extending protrusion that is adapted to be received in the notch to limit movement of the members relative to one another.

7. A modular toilet bowl assembly comprising:
- a toilet bowl that includes a bowl portion and an upper drain pipe portion, the upper drain pipe portion having an inlet opening into the toilet bowl and an outlet portion, the toilet bowl and the upper drain pipe portion being integrally formed as a single piece;
- a lower drain trap portion connected to the upper drain trap portion providing a continuous drain trap from the toilet bowl inlet to the waste outlet, the lower drain trap portion including: a seal ring in direct contact with the outlet of the upper drain pipe portion;
- wherein the lower drain trap portion includes a first drain pipe coupled to the upper drain pipe portion, the first drain pipe also including a first drain pipe mounting plate, and a second drain pipe in fluid communication with the first drain pipe and a waste outlet, the second drain pipe including a second drain pipe mounting bracket.

8. The toilet bowl assembly of claim 7, further comprising:
- a plurality of extension segments that can be added to the drain pipe to adjust a dimension of the drain pipe.

9. The system of claim 7, further comprising:
- an extension segment located between the seal ring and the lower drain pipe portion to allow adjustment of the height of the toilet bowl assembly.

10. The system of claim 9, wherein each of the extension segments include:
- a locking element that is adapted to lock in connection with an adjacent segment.

11. The system of claim 7, wherein the lower drain pipe portion is formed of PVC.

12. The system of claim 7, wherein the first drain pipe segment has an internal fluid passage extending from a first end to a second end and wherein a step protrusion extends into the fluid passage at a location between the first and second ends to cause fluid passing through the fluid passage to gather in the vicinity of the step protrusion.

13. The system of claim 7, wherein a first end of the second drain pipe is formed with complementary coupling portions so that a second end of the first drain pipe and the first end of the second drain pipe can be coupled to form a drain pipe of predetermined length; and wherein the complementary coupling portions comprise an expanded sleeve on one member that is adapted to receive the other member and wherein the expanded sleeve is formed with an axial notch and the other member is provided with a radially extending protrusion that is adapted to be received in the notch to limit movement of the members relative to one another.

* * * * *